United States Patent
Bodensteiner et al.

(10) Patent No.: US 9,003,758 B2
(45) Date of Patent: Apr. 14, 2015

(54) LOW-WASTE METHOD FOR PRODUCING HIGH-PERFORMANCE CHAIN LINK PLATES

(71) Applicant: IWIS Motorsysteme GmbH & Co., KG, Munich (DE)

(72) Inventors: Martin Bodensteiner, Munich (DE); Wolfgang Krause, Penzberg (DE); Richard Koschig, Freising (DE)

(73) Assignee: Iwis Motorsysteme GmbH & Co., KG, Munich (DE)

( * ) Notice: Subject to any disclaimer, the term of this patent is extended or adjusted under 35 U.S.C. 154(b) by 47 days.

(21) Appl. No.: 13/774,946

(22) Filed: Feb. 22, 2013

(65) Prior Publication Data
US 2013/0225345 A1    Aug. 29, 2013

(30) Foreign Application Priority Data
Feb. 23, 2012    (DE) .......................... 10 2012 003 558

(51) Int. Cl.
| | |
|---|---|
| *B21L 9/00* | (2006.01) |
| *F16G 13/07* | (2006.01) |
| *B21L 11/00* | (2006.01) |
| *F16G 13/02* | (2006.01) |
| *F16G 13/04* | (2006.01) |
| *F16G 13/06* | (2006.01) |
| *B21L 9/06* | (2006.01) |

(Continued)

(52) U.S. Cl.
CPC ................. *B21L 11/00* (2013.01); *F16G 13/02* (2013.01); *F16G 13/04* (2013.01); *F16G 13/06* (2013.01); *B21L 9/065* (2013.01); *B21D 28/06* (2013.01); *B21D 53/14* (2013.01)

(58) Field of Classification Search
CPC ........... B21L 9/00; B21L 11/00; B21L 15/00; F16G 13/16
USPC .............................. 59/5, 6, 8, 13, 15, 35.1, 78
See application file for complete search history.

(56) References Cited

U.S. PATENT DOCUMENTS

| | | | |
|---|---|---|---|
| 1,127,072 A | * | 2/1915 | Morse ............................ 59/35.1 |
| 4,328,665 A | * | 5/1982 | Taubert et al. .................... 59/13 |
| 4,411,131 A | * | 10/1983 | Ohnishi et al. .................... 59/78 |

(Continued)

FOREIGN PATENT DOCUMENTS

| | | |
|---|---|---|
| AT | 57821 | 10/1912 |
| CN | 201223920 Y | 4/2009 |

(Continued)

*Primary Examiner* — David B Jones
(74) *Attorney, Agent, or Firm* — Baker and Hostetler LLP

(57) ABSTRACT

A method for producing high-performance chain link plates with a link plate pitch T, comprises: clocked feeding of a sheet metal band with a feed length V per cycle, pre-punching at least two chain link plate blanks arranged in succession, re-cutting at least one chain link plate blank, wherein at least the still connected head areas of the chain link plate blanks arranged in succession are excepted from the re-cutting process separating the connected head areas of chain link plate blanks arranged in succession, wherein the feed length V is smaller than 2.1×T and the upper and/or lower side of the head areas connected to each other is/are provided at least partially with a concave run by a punching process substantially adjacent to the end face produced later. A method is also provided for producing a high-performance chain and to correspondingly produced high-performance link plates and high-performance chain.

33 Claims, 8 Drawing Sheets

(51) Int. Cl.
*B21D 28/06* (2006.01)
*B21D 53/14* (2006.01)

(56) References Cited

U.S. PATENT DOCUMENTS

| | | |
|---|---|---|
| 6,068,568 A | 5/2000 | Kozakura et al. |
| 7,758,461 B2 | 7/2010 | Feld et al. |
| 2008/0194367 A1 | 8/2008 | Feld et al. |

FOREIGN PATENT DOCUMENTS

| | | |
|---|---|---|
| CN | 201350491 Y | 11/2009 |
| DE | 493910 | 2/1930 |
| DE | 2814587 A1 | 10/1979 |
| DE | 29708497 U1 | 11/1997 |
| DE | 202007002046 U1 | 7/2008 |
| EP | 0040120 A1 | 11/1981 |

\* cited by examiner

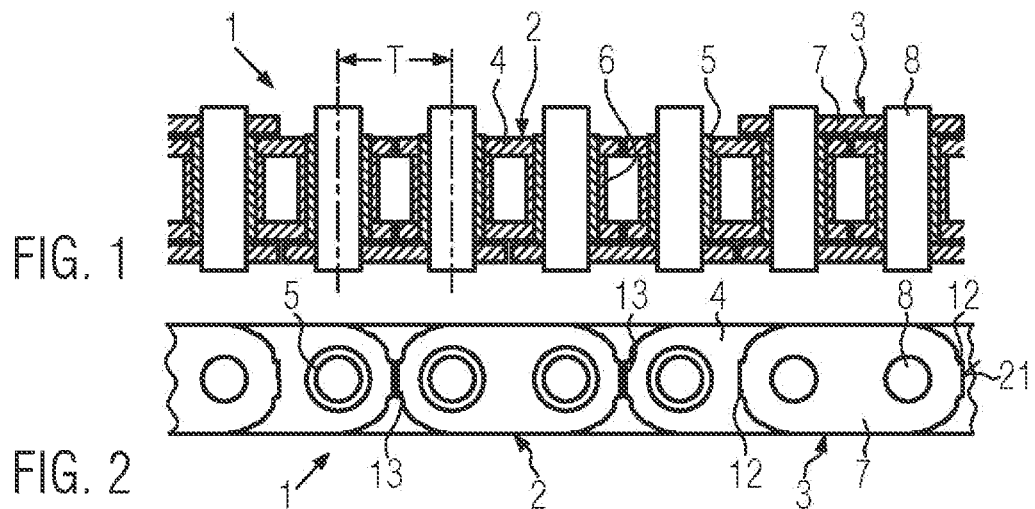
FIG. 1
FIG. 2
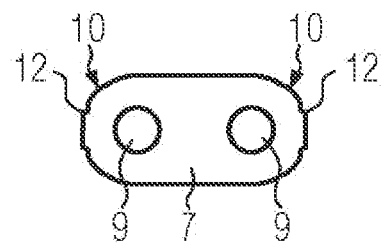
FIG. 3
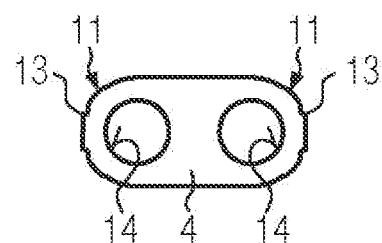
FIG. 4

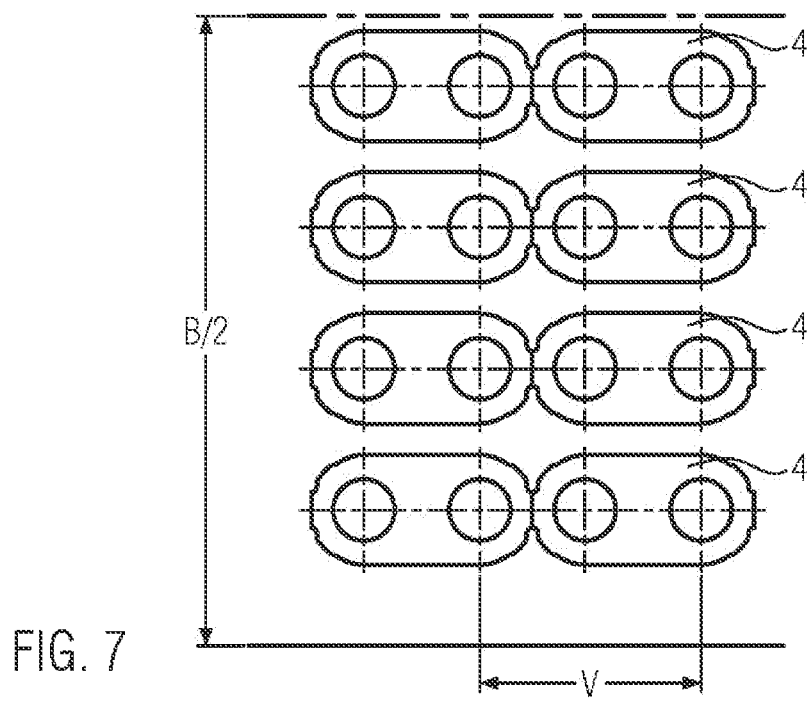
FIG. 7
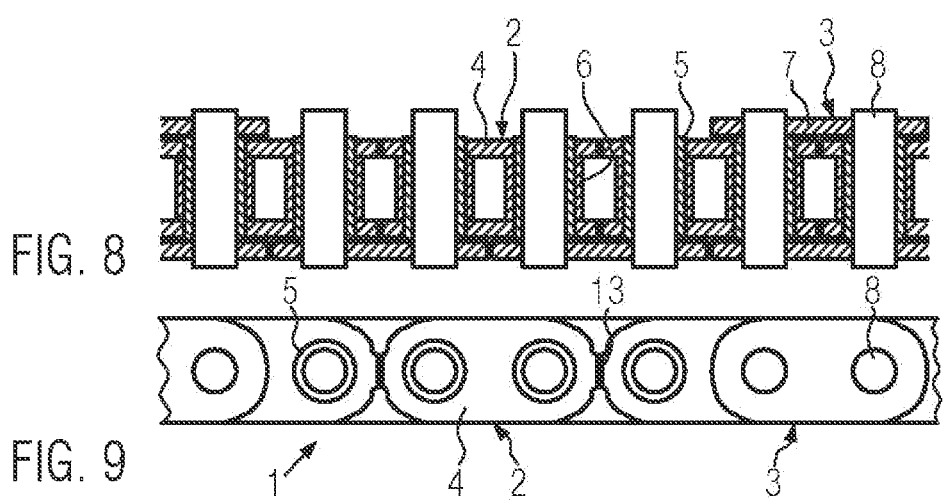
FIG. 8
FIG. 9

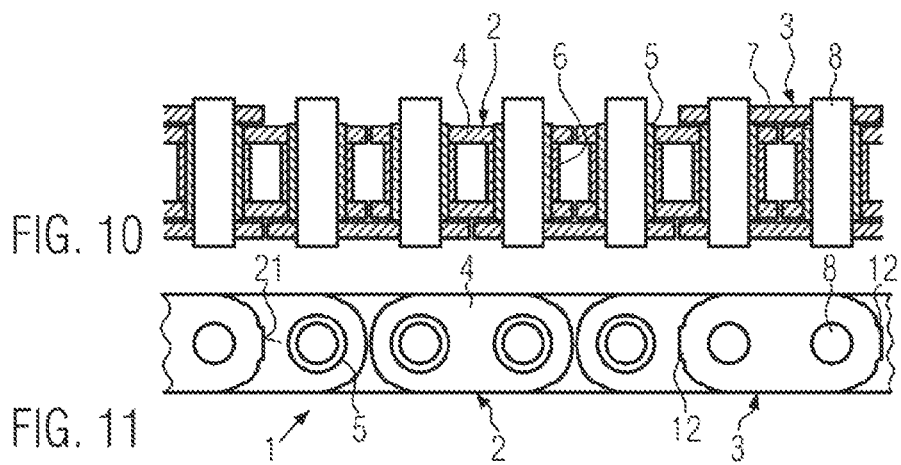
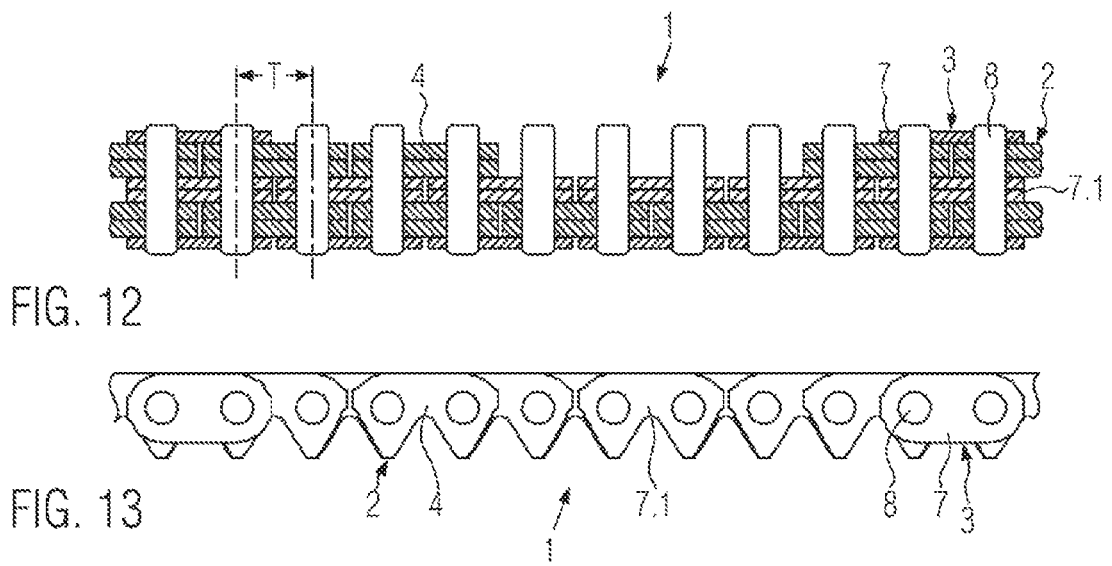

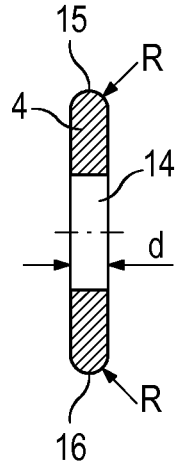
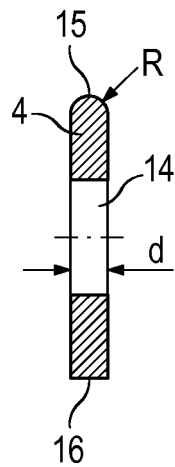
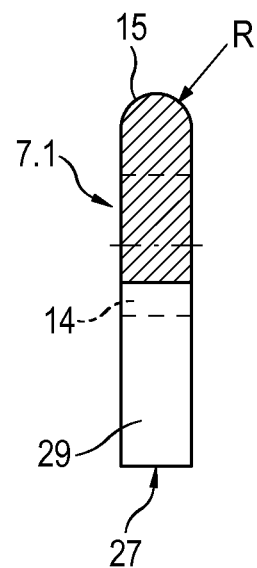
FIG. 20　　　　　FIG. 21　　　　　FIG. 22
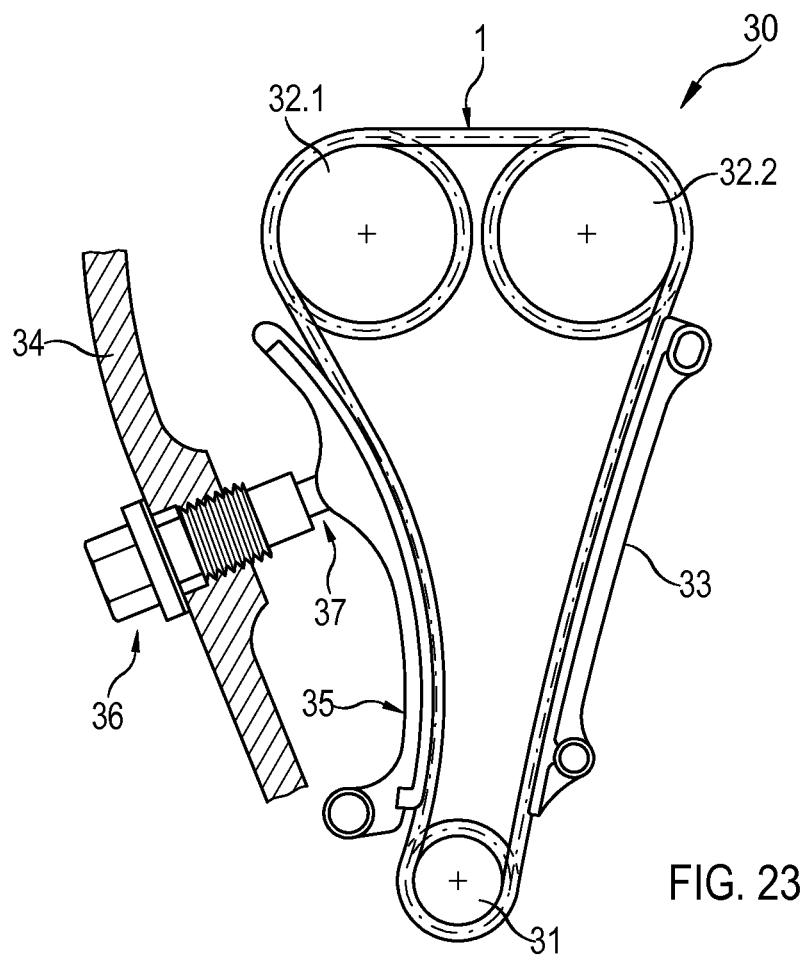
FIG. 23

LOW-WASTE METHOD FOR PRODUCING HIGH-PERFORMANCE CHAIN LINK PLATES

CROSS-REFERENCE TO RELATED APPLICATION

This application claims priority to foreign German patent application No. DE 102012003558.6, filed on Feb. 23, 2012, the disclosure of which is incorporated by reference in its entirety.

FIELD OF THE INVENTION

The present invention relates to a method for producing high-performance chain link plates with a link plate pitch T, the method comprising the following steps of: clocked feeding of a sheet metal band with a feed length of V mm per cycle, pre-punching at least two chain link plate blanks arranged in succession, re-cutting at least one functional area of the at least one chain link plate blank, wherein the head areas of the chain link plate blanks arranged in succession are still connected to each other, and separating the connected head areas of the chain link plate blanks arranged in succession.

BACKGROUND

High-performance chains and the high-performance chain link plates required for these chains are almost exclusively used for internal combustion engines and are subjected to challenges that can be called extreme as compared to other chain applications. Such automobile chains are used, for instance, for control assemblies for coupling the at least one camshaft to the crankshaft, or, for instance, for dynamic balancers in gasoline engines. For instance, maximum chain speeds of 12 m/sec occur in a control assembly of a diesel engine at 5000 rpm, or of up to 40 m/sec in a dynamic balancer of a gasoline engine at 7500 rpm. That is, the chains run extremely fast. Furthermore, automobile chains run in an engine oil environment that puts additional stress on the chain material. Also, automobile chains are subjected to extreme dynamics. There may be load changes from 2000 N to 200 N and vice versa within the range of a few milliseconds with long-life requirements of 200,000 to 300,000 km. In connection with high-performance chain link plates it is important that they have so-called functional surfaces with a certain low surface roughness that can be obtained only by precision blanking or re-cutting, while other regions of the high-performance chain link plates, in particular the head areas of the high-performance chain link plates pointing to each other, need to have a low surface roughness. In automobile drives the chains frequently run along guide rails and/or tensioner blades. To this end, the chains have a link plate back with a corresponding surface quality so as to achieve adequate service lives both for the chain and the rails. Moreover, not only untoothed sleeve-type chains and bush roller chains but also toothed chains are used in automobile drives. The contour of the tooth being a functional surface is likewise subjected to a re-cutting process or precision punching. Depending on the construction type and the design of the toothed chain the outer and inner flanks, or at least the outer or the inner flanks are engaged with the chain wheels. To this end, the tooth contours have to be either precision-blanked or re-cut in order to obtain the desired surface quality. Such a re-cut tooth link plate is described, for instance, in DE 202007002046. Typically, also the openings in the links (receiving the pins and/or sleeves) are re-cut and can then also be regarded as functional surfaces or functional areas.

The production of such high-performance chain link plates is commonly realized with a sheet metal band which is supplied to the punching machine as strip stock. The high-performance chain link plates are punched out of the sheet metal band in several punching steps, wherein usually the longitudinal axes of the chain link plates are oriented in parallel to the longitudinal edge of the sheet metal band, and, as a rule, several punching tracks are provided. A common format are, for instance, 8 punching tracks side by side. A straight chain link plate for a chain having a chain pitch of 8 mm, with a link plate length of 15.55 mm, requires a feed length V of 17 mm. The distance between two link plates arranged in succession in such an embodiment is 1.45 mm and the distance of two punching tracks is about 2.25 mm. These distances are necessary to allow the formation of sufficiently stable punches which move between the link plate blanks and punch out the waste material. As a certain edge distance to the edge of the sheet metal band is necessary, too, a considerable amount of punching waste is produced in the mass production of such high-performance chain link plates.

SUMMARY OF THE INVENTION

Hence, it is the object of the present invention to provide a lower-waste method for producing high-performance chain link plates of the aforementioned type.

According to the invention this object is achieved by making the feed length V smaller than 2.1×T and by providing the upper and/or lower side of the head areas connected to each other with an at least partially concave run by means of a punching process substantially adjacent to the end face produced later. The inventors have realized that it is not imperative to make a punch move entirely between two successive link plate blanks to separate the link plate blanks. Rather, a feed can be used which is substantially smaller than was previously required for reasons of geometry and stability. Based on the punching methods used for high-performance chain link plates such a reduction of the feed length V had not been possible so far. A minimum material quantity between the head areas of the chain link plates to be produced later had always been necessary. The reduction of the feed under the herein specified limit value saves strip stock in the longitudinal direction. Thus, savings, for instance, of 8% to 10% can be achieved. With the quantities of high-performance chain link plates to be produced this constitutes a considerable saving effect, especially since the prices for raw materials have gone up significantly in the past years. The upper and/or lower sides of the head areas connected to each other are provided with a concave run by means of a punching process substantially adjacent to the end face produced later. The concave run serves to minimize or avoid notch effects which may occur as a result of the waste-free separation and the usually poorer quality of the end face. Substantially adjacent to the end face means that the concave run reduces or prevents a negative influence of the separation surface (end face) on the stability and endurance strength of the link plate. The concave run accordingly has the effect that the junction at the upper and lower side between the end face and the rest of the contour run of the link plate is subjected to a reduced tension. This junction may even have a better surface quality than the end face.

In order to provide the high-performance chain link plates with enough stability also in the head area the feed length V is in one embodiment preferably in a range of 1.8 to 2.1×T, preferably 1.9 to 2.0×T.

In an optimized version the feed length V corresponds to the length L of the finished high-performance chain link plates, preferably including a tolerance of ±0.2 mm. The high-performance chain link plates are therefore strung together substantially without gaps in the longitudinal direction and separated by suitable separation methods in an area that is rather uncritical with respect to stress and which does not require high surface qualities.

In one modification the connected head areas are advantageously separated by a substantially waste-free separating cut. As the waste bridge produced in prior art methods and constituting waste is no longer there, practically no waste is produced in the separation process.

In one embodiment it is proposed that by means of the substantially waste-free separating cut the head area is provided with an end face that runs in an angle range of ±30° relative to a vertical, preferably perpendicular relative to the longitudinal axis of the link plate. Depending on the available space and desired stability various runs of the end face are feasible. As a rule, a straight end face which is oriented vertically relative to the longitudinal axis of the link plate will be preferable, however, because this constitutes a simplification of the tool.

Moreover, the ratio of the radius $R_K$ of the concave run at the head areas to the pitch T may be 0.04 to 0.07, preferably 0.048 to 0.055. This ratio of dimensions sufficiently reduces the notch effect. The herein specified size range is relevant in particular for roller chains/sleeve-type chains.

Preferably, the ratio of the length $L_S$ of the end face to the pitch T may be in the range of 0.2 to 0.4, preferably 0.28 to 0.32. The length of the end face and thus of the separation surface should be as small as possible so that the separation process only has a small influence on the quality of the link plate to be produced. On the one hand, the separation surface having a poorer surface quality is then as small as possible, and the impact of the notch effects is not so dramatic. On the other hand, the separation forces need not be so great, which might result in a deformation of the link plate during the separation. Especially with directly successive chain link plate blanks within a sheet metal strip this is of great significance for the quality of the high-performance chain link plates to be produced.

According to another modification of the method in which at least two punching rows are used for the production of toothed high-performance chain link plates the re-cutting at least of the tooth flanks of the toothed chain link plate blank is accomplished such that the crest areas of the teeth pointing to each other of two punching rows placed side by side remain coupled. In the prior art, too, the teeth of two blanks arranged side by side pointed to each other for the punching of associated punching rows (double punching track). However, so far the entire run of the tooth contour was re-cut, including the crest areas. This made it necessary to move a pre-punching tool between the two link plates first, which required a certain bridge width between the tooth crests. In the method according to the inventive modification it is provided, however, that only the tooth flanks required later for the function are re-cut, while the tooth crests are excepted from that and, furthermore, may even remain connected. This may lead to a more precise re-cutting process of the tooth flanks.

Therefore, the crest areas connected to each other are preferably separated from each other after the re-cutting of the tooth flanks.

The features of claim 8 represent an independent invention which may also be considered independently of the features of claim 1. In the production of toothed high-performance chain link plates this method alone allows a reduction of the punching waste up to about 20% as compared to previously used punching methods. Of course, the value to be obtained very strongly depends on the number of chosen punching rows per sheet metal strip.

If both measures are combined in the production of toothed high-performance chain link plates (waste reduction in longitudinal and transverse direction), then material can be saved up to 30%. In this case, too, the precise value depends significantly on the number of the punching rows used. However, these values are impressive, and they demonstrate the great saving potential in the production of high-performance chains, which can be regarded as mass products, especially in the automobile industry.

In one modification of the method the punching row width (double punching track) of the chain link plate blanks connected to each other in the crest areas substantially corresponds to double the link plate height of the finished high-performance chain link plate. In this case, too, no space is provided between the chain link plate blanks of the punching rows which are placed side by side and are punched collectively in the punching process. This means that previously common punching waste, which was bound to be present between the crest areas to be produced of two chain link plate blanks placed side by side, no longer exists. Punching row width refers in this context to the total height of two punching rows whose teeth are pointing towards each other. For tooth link plates having a straight link plate back this is the distance from link plate back to link plate back.

Preferably, the connected crest areas are separated from each other by means of a substantially waste-free separating cut. As the crest areas are not in contact with the chain wheel the surface quality may here by poorer than that of the tooth flanks.

Preferably, the waste-fee separation for separating the connected crest areas may be accomplished substantially in or parallel to the feed direction to produce crest areas each with a straight end face. This simplifies the embodiment of the tool.

In order to avoid a notch effect between the outer and the inner flanks and the crest area it is possible in a modification of the method to provide the junction regions between the outer and inner flanks and the connected crest areas with an at least partially concave run by means of a punching process substantially adjacent to a separation surface produced later. This measure reduces the notch effect. Moreover, the surface quality of these junction regions can be optimized in an advantageous manner, and it may be better than that of the separation surface.

Advantageously, the ratio of length $L_z$ of the separation surface to the pitch T may be in the range of 0.14 to 0.24, preferably 0.15 to 0.19. By observing the value range it is prevented that the teeth of a tooth link plate are deformed by the separation process.

For toothed high-performance chain link plates the ratio of the radius $R_{K1}$ and $R_{K2}$ of the concave run at the head areas to the pitch T may be 0.07 to 0.15, preferably 0.12 to 0.145. Therefore, the radius chosen for toothed high-performance chain link plates is greater so as to obtain a sufficient reduction of the notch effect.

In the crest area of a toothed high-performance chain link plate, too, an adequate radius is desired. In this case, the ratio of the radius $R_S$ of the concave run at the crest area to the pitch T may be 0.07 to 0.09, preferably 0.077 to 0.081.

Radius $R_K$ or $R_{K1}$ or $R_{K2}$ or $R_S$ refers in this case to the averaged radius, provided a varying radius is used.

According to a further development, which also enjoys independent protection, the sheet metal band may have at least one side edge face with a convex curvature that runs transversely to the longitudinal axis of the sheet metal band, wherein after the pre-punching and separating the link plate back is shaped by a section of the convex side edge face of the sheet metal band, at least in a region of a supporting section which can be brought into a sliding contact with a tensioner blade or guide rail. Thus, the contact surface of the link plate back on the guide surface of the tensioner blade or guide rail is reduced, on the one hand, while the contact pressures do not become too great, on the other hand, and the lubricating film may continue to have an effect. The link plate back is, accordingly, adapted to be arched transversely to the running direction of the chain. In the first approximation the convex curvature could also be formed by a multiple polygon. It has surprisingly been found that the transversely running convex curvature, too, supports the formation of a lubricating film. Additionally, of course also profilings of the link plate back may be provided in the longitudinal direction of the respective link plate, which also entail a reduction of the contact surface. In such an embodiment a re-cutting of the link plate back is not necessary.

Advantageously, the radius of the convex curvature may correspond approximately to half the link plate thickness. This permits the relatively easy production of such a curvature because the link plate back, seen in cross section, then passes tangentially over into the side face of the link plates.

The convex curvature should preferably only be provided where a contact with the tensioner blade or guide rail is realized. A corresponding shaping at other locations is not necessary.

According to a modification the curvature in the junction region between the link plate back and the end face of the inner and outer link plates provided with a curved link plate back may be reduced. The curvature results from the equation 1/R, wherein R is equal to the radius of the curvature. That is, the larger the radius R, the smaller the curvature. A straight surface therefore has a curvature of 0. As a rule, the curved link plate back will therefore pass over into a head area that runs straight perpendicular to the longitudinal center line. This also results in positive sliding effects when the plate link chain slides onto or off the tensioner blade or guide rail. Moreover, it is an advantage with respect to the production costs (e.g. tool expenses) if as many side areas of the link plates as possible have a straight shape.

According to another embodiment it may be provided that inner or outer link plates comprise two pin or sleeve openings arranged with a distance there between and the link plate back is indented in the region between the pin or sleeve openings, while the regions above the pin or sleeve openings are elevated. The term "elevated" implies that it refers to the area of the link plate back that is arranged inside an area that extends in a section between the front end and the rear end of the associated pin openings or sleeve openings and, of course, depends on the viewing angle of the link plate. This measure reduces the contact area of the back of the link plate essentially to two elevated areas (supporting sections) of the link plate back. The indented area provided there between is used as a pocket for the lubricating agent, at which a hydrodynamic cushion may build up. The term "indented" does not refer to the production method, but merely to the shape.

Preferably, exclusively at least a part of the inner link plates or exclusively at least a part of the outer link plates may comprise a link plate back that can be brought into a sliding contact with a tensioner blade or guide rail. With chains, this measure permits an additional reduction of the contact between tensioner blades or guide rails as only a part of the link plates is in sliding contact with the blades or rails.

According to a preferred modification of a toothed chain or sleeve-type chain exclusively the inner link plates are in contact with a tensioner blade or guide rail.

This modification shows that the link plate back need not necessarily be subjected to a pre-punching step and re-cutting step, but is automatically formed by the side edge face of the sheet metal bands. Thus, not only the punching process can be facilitated considerably, but also material costs may be saved. For high-performance chain link plates for roller chains and sleeve-type chains one re-cutting process for the pin openings and sleeve openings may then be enough.

In addition, the invention relates to a method for producing a high-performance chain using high-performance chain link plates which are produced by means of a method according to one of claims 1 to 17. Especially if feeds are used that are smaller than 2.0×T, and preferably greater than 1.9×T, a sufficient distance of the head areas of the finished high-performance chain link plates within the high-performance chain can be achieved, so that the head areas, even if they have a rather projecting configuration or design, do not contact each other when pivoting about adjacent chain joints.

The invention further also relates to a high-performance chain link plate comprising head areas and at least one re-cut functional area, wherein the head areas each have an end face that runs in an angle range of ±30° relative to a vertical, preferably substantially perpendicular relative to the longitudinal axis of the link plate, and is produced by means of a waste-free separating cut, and the upper and/or lower side of the head areas have an at least partially concave run substantially adjacent to the end face. One skilled in the art is able to make a difference between a waste-free separating cut and a punched surface involving waste, so that it is definitely identifiable by means of the end face that the high-performance chain link plate was produced by such a waste-free separating cut in the region of its end face. The straight cut portion is usually below 50% (depends on the time of use of the tool), and there is a clear fracture face. The surface roughness is clearly worse than that of the re-cut functional areas. The concave run on the upper side and lower side provides for a reduction of the notch effect.

Preferably, the head areas may have a projecting link plate type shape relative to the adjacent link plate contour. This facilitates the separation of the head areas, without a collision taking place with those that have better functional areas as far as the surface quality is concerned. In this case, the shape is chosen and the distance to the nearest opening is determined in such a way that a series collision of successively arranged high-performance chain link plates on the chain is prevented.

According to one embodiment a high-performance chain link plate comprises two teeth, wherein the crest areas of the teeth each have a separation surface or end face, respectively, that runs in an angle range of ±30°, preferably substantially in parallel, relative to the longitudinal axis of the link plate and is produced by means of a waste-free separating cut. In this case, too, one skilled in the art is able to identify immediately by means of the end face how it was produced, particularly that a waste-free separating cut was made. So far, the crest areas had been re-cut and precision-blanked. This can now be waived.

The features of claim 21 can also be considered independently of the features of claims 19 and 20 and represent an independent invention.

Moreover, the crest areas may have a link plate type shape which is offset relative to the adjacent link plate contour. By this, a clear difference is made between the crest area and, for instance, the outer and/or inner flanks, so that corresponding contours with adequate surface qualities may be used in the junction regions so as to reduce the notch effect.

Additionally, a link plate back area of a supporting section which can be brought into a sliding contact with a tensioner blade or guide rail may have a convex curvature that runs transversely to the longitudinal center line of the high-performance chain link plate. Such a low-friction high-performance chain link plate can be produced correspondingly cost-effectively.

The invention also relates to a high-performance chain comprising high-performance chain link plates according to one of claims 19 to 23. Such a chain is much more inexpensive to produce as the production process for the high-performance chain link plate requires far less material. The demands on such high-performance chain link plates have constantly become higher in the past years and decades, with the consequence that more high-grade materials and thermal treatment methods have to be used. Hence, the saving of material in the production process is a great advantage and leads to reduced costs.

BRIEF DESCRIPTION OF THE DRAWINGS

The invention will be explained in more detail below by means of drawings. In the drawings:

FIG. 1 shows a sectional view of a first embodiment of a low-waste high-performance chain, with an outer link plate being omitted on one side of two outer chain links for reasons of clarity, FIG. 2 shows the high-performance chain of FIG. 1 in a lateral view, FIG. 3 shows a lateral view of an outer link plate of the high-performance chain of FIG. 1, FIG. 4 shows a lateral view of an inner link plate of the high-performance chain of FIG. 1, FIG. 7 shows a reduced illustration of half a sheet metal strip having a total of eight punching rows, FIG. 8 shows a sectional view of a second embodiment of a high-performance chain, with an outer link plate being omitted on one side of two outer chain links for reasons of clarity, FIG. 9 shows the high-performance chain of FIG. 8 in a lateral view, FIG. 10 shows a sectional view of a third embodiment of a high-performance chain, with an outer link plate being omitted on one side of two outer chain links for reasons of clarity, FIG. 11 shows the high-performance chain of FIG. 10 in a lateral view, FIG. 12 shows a sectional view of an embodiment of a toothed high-performance chain, with outer link plates and inner link plates being omitted on one side of some outer and inner chain links for reasons of clarity, FIG. 13 shows the high-performance chain of FIG. 12 in a lateral view, FIG. 23 shows a schematic view of a chain drive.

DETAILED DESCRIPTION

Figure 5:
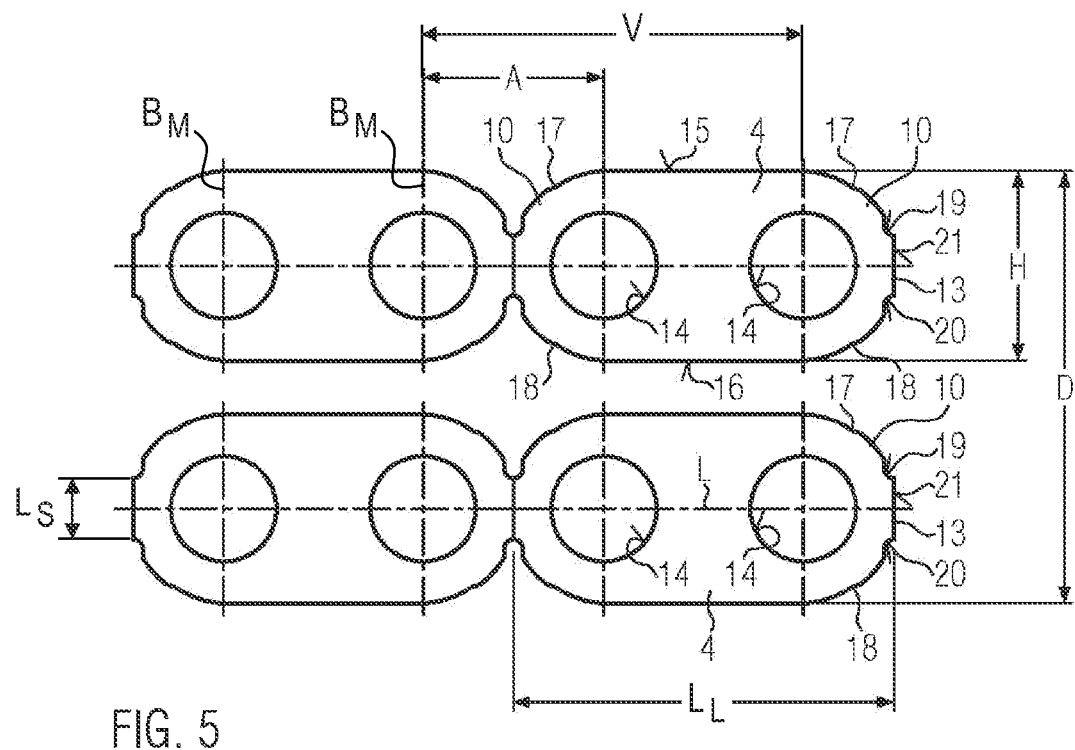
FIG. 5 shows two punching rows placed side by side for the low-waste punching of two straight inner chain link plates.

A first embodiment of the invention will be explained in more detail by means of FIGS. 1 to 7.

The high-performance chain 1 shown in FIGS. 1 and 2 is configured as a roller chain which comprises alternating inner and outer chain links 2, 3 connected to each other by a chain joint. Each inner chain link 2 comprises two inner link plates 4 arranged with a distance there between and two joint sleeves 5 connecting these inner link plates 4 to each other, and two rotatably mounted rollers 6 each arranged on a joint sleeve 5. The joint sleeves 5 are pressed into corresponding sleeve openings 14 of the inner link plates 4 and project slightly on the side.

The outer chain links 3 comprise two outer link plates 7 arranged with a distance there between and two chain pins 8 connecting the outer link plates 7 to each other and arranged with a parallel distance relative to each other. The chain pins 8 are pressed into corresponding pin openings 9 of the outer link plates 7 and project slightly on the side. A chain pin 8 extends through a joint sleeve 5. The chain pin 8 of the outer chain link 3 forms together with the associated joint sleeve 5 of the inner chain link 2 a chain joint.

The production is accomplished with a steel band the thickness of which corresponds to the link plate thickness. This steel band is moved from a reel through a punching machine with a clocked, stepwise feed with the feed length V. A total of up to 15 pre-punching, re-cutting, punching and separating processes carried out successively can be performed until the finished high-performance chain link plate has been produced.

Figure 6:
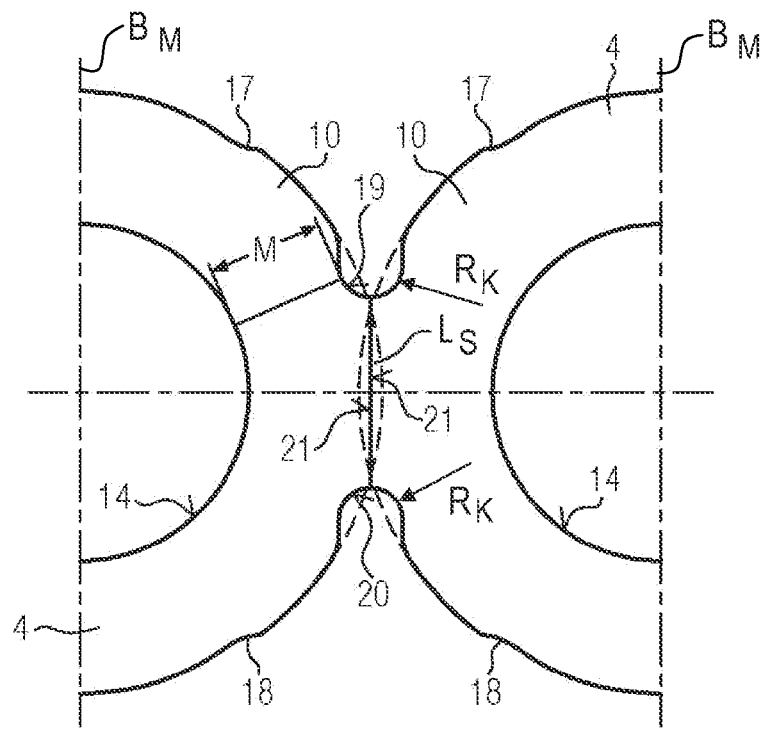
FIG. 6 shows an enlarged view of the connected head areas of the chain link plate blanks of FIG. 5.
Figure 14:
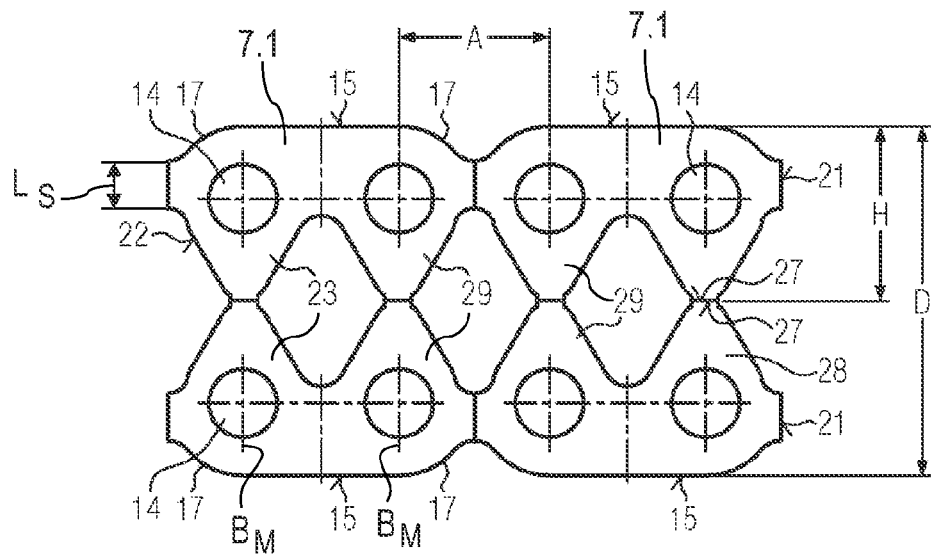
FIG. 14 shows two punching rows place side by side for the low-waste punching of toothed chain link plates.

Both the inner link plates 4 and the outer link plates 7 of the high-performance chain 1 described herein have been produced by a low-waste punching method and, therefore, have a special form that will be additionally explained in more detail below by means of FIGS. 5 and 6.

The high-performance chain has a pitch T. In current automotive applications it may be 6.35 mm, 7 mm, 8 mm or 9,525 mm. Each of the link plates 4, 7 has a tab-shaped prolongation 12 and 13 at their head area 9 and 10. This tab-shaped prolongation 12 and 13 is mainly due to the low-waste punching.

Based on FIG. 5 the production of inner link plates 4 will now be explained by means of an example. The production is accomplished by using a sheet metal band from the reel which already has the final link plate thickness. The sheet metal band is moved forwards with a clocked feed length V, and a processing operation is carried out in the punching machine after each cycle step. FIG. 5 shows two punching rows placed side by side in parallel. The inner link plates 4 are pre-punched first, thus substantially receiving their basic shape. The head areas 11 are not separated from each other at the prolongations 13 to be produced later, so that initially a band of successively arranged link plate blanks is provided. The pre-punching is realized with a relatively small straight cut portion and a rough surface quality. This applies, on the one hand, to the outer contour exposed by the pre-punching as well as to the pre-punched sleeve openings 14.

In subsequent punching cycles the sleeve openings 14 as well as the link plate back 15 and the link plate belly 16 are re-cut. As only a relatively small amount of material is removed during the re-cutting a surface is formed with a relatively high straight cut portion (about 70 to 85%) and a surface roughness of not worse than $R_z=9$. In this process re-cut junctions 17 and 18 provided with a radius are produced both on the link plate back 15 and the link plate belly 16. These re-cut junctions 17, 18 characterize at the same time also the junction from the link plate back 15 to the head area 11 and from the link plate belly 16 to the head area 11. In additional steps a slide grinding may be provided to additionally improve the surface quality of the sleeve openings 14, and also of the link plate back 15 and the link plate belly 16. In another punching step the connected head areas 11 are shaped further so that the upper side and the lower side 19, 20 of the tab-shaped prolongation 13 are provided with a concavely curved run having a radius $R_K$. Here, the dimension M must be taken into account, which represents the smallest distance between the sleeve opening 14 and the upper side 19 and the lower side 20 and is important for the stability of the link plates.

The arrangement of the still connected link plate blanks is chosen such that the distance A between two adjacent sleeve openings 14 of different link plate blanks is smaller than the chain pitch T.

Exemplary values for the radius $R_K$ on the upper side 19 and the lower side 20 are 0.4 mm for a pitch T of 8 mm and 0.5 mm for a pitch of 9.525 mm. The ratio between the radius $R_K$ and the pitch T accordingly corresponds in the first case to 0.05 and in the second case to 0.052 and, thus, is in the range of 0.04 to 0.07, preferably 0.048 to 0.055.

The double track width D is more than double the size of the link plate height H. Usually a minimum distance of about 1.5 to 2.5× band thickness is chosen to ensure a sufficient stability of the punch moving in between the punching rows. Finally, the link plate blanks are separated by means of a waste-free separating cut. The separating cut is made centrally relative to the two adjacent sleeve openings 14 of two adjacent link plate blanks so that a straight end face 21 running vertically relative to the longitudinal axis L of the link plate (preferably perpendicular to the longitudinal axis L of the link plate or in an angle range of ±30) is formed. This separating cut is carried out with a surface quality that is smaller than the surface quality of the re-cut areas. Usually, a surface roughness of $R_z$ 63 to 100 is enough. The straight cut portion is only about 20% to 30%. On the whole, a rougher fracture pattern is provided on the end face 21.

The length $L_S$ of the end face 21 and thus of the separating cut for a chain with a pitch T of 8 mm is, for instance, 2.4 mm and for a pitch T of 9.52 mm 2.8 mm. This corresponds to a ratio of length $L_S$ to pitch T of 2.4 and 2.8 and, thus, is in the range of 0.2 to 0.4, preferably 0.28 to 0.32.

Due to the fact that no punch is moved in between the link plate blanks placed in succession in a punching track, separating them, no punching waste is created at this place. Thus, it is possible to use a punching feed with a feed length V of smaller than 2.1×T (preferably in the range of 1.8 to 2.1×T, and more preferably 1.9 to 2.0×T). In the present example the feed length V of a chain having an 8 mm pitch is 15.25 mm, which means 1.90625×T. The link plate length $L_L$ substantially corresponds to the feed length V with a tolerance of ±0.2 mm. Contemplating this it has to be kept in mind that the link plate pitch slightly deviates from the actual chain pitch T for reasons of tolerance and production.

As compared to a conventionally produced inner high-performance link plate, during the production process of which a punch with a sufficient punch thickness (about 1.2-2× band thickness) separating the head areas has to be moved between same, the method chosen here and the arrangement of the link plate blanks permits a saving of material relative to the sheet metal band. Even if eight punching tracks are arranged side by side, as is shown in FIG. 7 (only the lower half is shown), a saving of material of approximately 10% can be achieved (width of sheet metal band 88 mm). With respect to the quantity of the chain link plates to be produced in the automobile sector this is by all means a remarkable dimension and results altogether in more cost-effective high-performance chains. On designing the link plates it has to be taken into account that the tab-shaped projections of adjacent head areas are spaced apart from each other to an extent that prevents them from interfering with each other when they pivot about the chain joints. In FIG. 6 the contours of previously produced inner link plates are shown dashed. Alone the illustrated overlapping region Z demonstrates that on account of the former shape of the link plates these had to be arranged with a greater space between them for the center points of the adjacent sleeve openings 14 to be further apart from each other. In addition, there was the punch moving between the head areas, thus creating additional punching waste. For a comparable inner link plate a feed length V of 17 mm was used in former times, while the method according to the invention can manage with V=15.25 mm in the embodiment described, i.e. a reduction of 1.75 mm.

The detailed illustration of the production of the outer link plates 7 is waived as the outer contours do not differ from the inner link plates 4 and merely the pin openings 9 are slightly smaller in comparison with the sleeve openings 14. However, the pin openings 9, too, are re-cut and smoothed by means of slide grinding, where necessary. Accordingly, the production of the outer link plates 7 takes place similarly.

The embodiments of a high-performance chain 1 shown in FIGS. 8 and 9 merely differ in that exclusively the inner link plates 4 are produced with tab-shaped prolongations 13, involving little waste. The embodiments of FIGS. 10 and 11 merely differ in that exclusively the outer link plates 7 were produced with tab-shaped prolongations 12 by means of low-waste punching. Therefore, depending on the alternative, different savings can be achieved.

Another embodiment of the present invention will now be explained in more detail by means of FIGS. 12 to 17. Described is now the production of a toothed high-performance chain 1. The toothed high-performance chain 1 is formed in the usual manner. There are most different models of toothed high-performance chains, all of which have access to the invention. If possible, identical reference numbers of the preceding embodiments are used. Hence, with respect to identical structural components and shapes similar in effect reference is supplementally made to the above description.

FIGS. 12 and 13 show a first embodiment of a toothed high-performance chain 1. As opposed to the preceding embodiment this chain is not formed as a sleeve type chain, but the respective link plates are sitting directly on the chain pins 8. In this embodiment the outer chain link 2 comprises two external untoothed outer link plates 7 which are each pressed onto the end regions of the chain pins 8, and two centrally disposed center tooth link plates 7.1 as well as the two chain pins 8. The center tooth link plates 7.1 are not pressed onto the chain pins 8. The inner chain links are merely formed of four toothed inner link plates 4, wherein two thereof are arranged on each side of the center tooth link plate package respectively. The openings 14 of these toothed inner link plates are loosely slid onto the chain pins 8 and form a chain joint together with same. The outer contour of the inner link plates 4 and the center tooth link plates 7.1 is identical. Merely the thickness is chosen differently for reasons of stability. As the production of the inner link plates 4 and the center tooth link plates 7.1 is otherwise identical reference will only be made to the inner link plates below. In this embodiment the outer link plates 7, the center tooth link plates 7.1 as well as the inner link plates 4 are configured to produce little waste. It is by all means possible, however, to perform any possible combination, so that only a part, or only one of these link plate types is configured to involve little waste, while the other ones are produced according to standard.

The production method will be exemplarily described by reference to the punching of the inner chain link plates 4. The production of the center tooth link plates 7.1 is accomplished in the same way. A toothed chain does usually not have any sleeves, but the tooth link plates are sitting directly on the chain pins. The inner link plates 4 are accordingly pivoted on the chain pins to form a chain joint. The production of the outer link plates 7 is accomplished in accordance with the description of the preceding embodiments.

Figure 15:
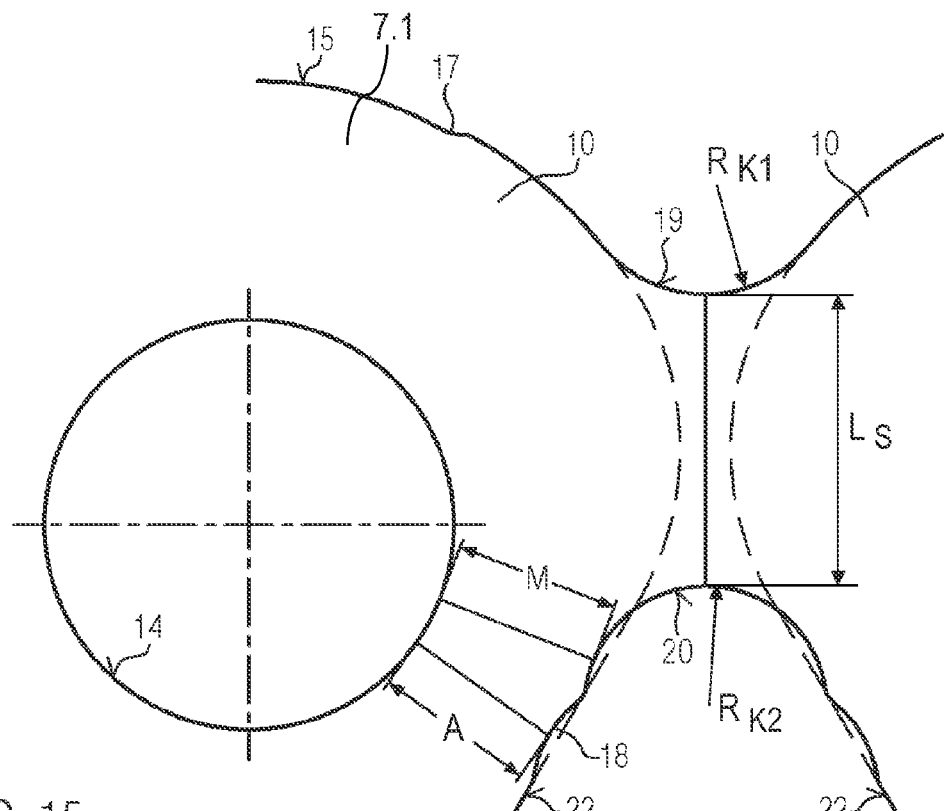
FIG. 15 shows an enlarged illustration of the connected head areas of the link plate blanks of FIG. 14.
Figure 17:
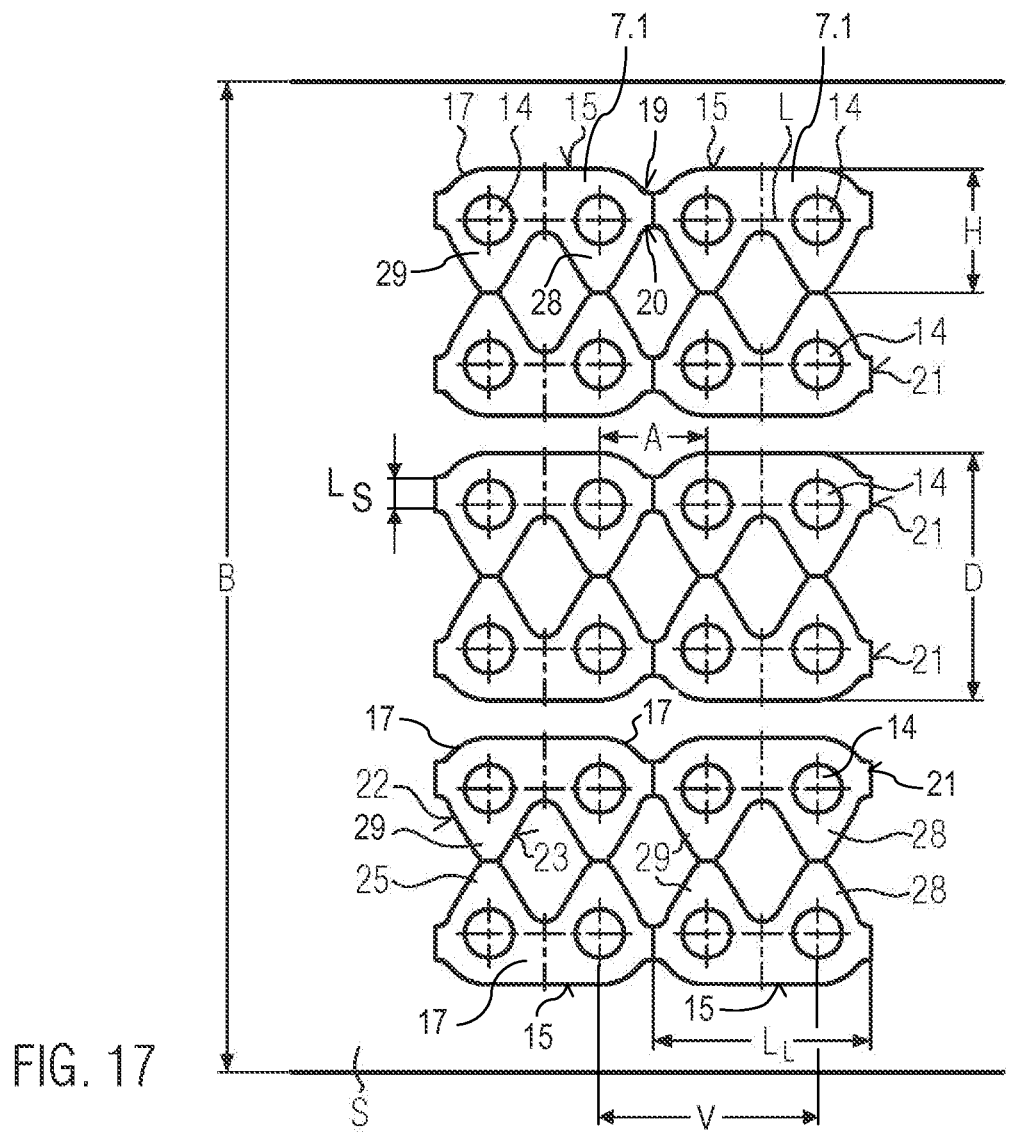
FIG. 17 shows a reduced illustration of a sheet metal band with a total of six punching rows for the production of toothed chain link plates.

The link plate back 15 with its re-cut junctions 17 and the adjoining concave contour with radius $R_{K1}$ on the upper side 19 of the tab-shaped prolongation 13 is formed substantially identically to the straight link plates. The situation is different with the toothed side of the inner link plate 4. The inner link plate 4 has two teeth 28, 29 with inner and outer flanks 22, 23. The outer flanks 22 and the inner flanks 23, too, are pre-punched first and then re-cut to improve the surface quality. The surface quality of the re-cut surfaces corresponds in this case to those of the preceding embodiments. In FIG. 15 it can be seen that a re-cut junction 18 in the form of a radius is provided between the outer flank 22 and the head area 10. This is adjoined by another concave run with a radius $R_{K2}$ to produce the lower side 20 of the tab-shaped prolongation 13. In this case, both the distance M between the lower side 20 of the head area 10 and the opening 14 and the distance A between the re-cut junction 18 and the opening 14 have to be taken into account for reasons of stability. Furthermore, these concave areas are provided with a good surface roughness to minimize notch effects. As can be seen in FIGS. 15 and 17 the head areas 10 of adjacent link plate blanks are still connected to each other during the entire punching process, except in the last step. Only in a last separation step are they separated by means of waste-free separation in order to produce a straight end face 21 exactly in the middle between the adjacent openings 14.

For instance, the radius $R_{K1}$ with a pitch T of 6.35 mm is 0.9 mm, and the radius $R_{K2}$ for the same pitch is 0.8 mm. This corresponds to a ratio between radius $R_{K1}$ and $R_{K2}$ and the pitch T of 0.142 and 0.126 and, accordingly, is in the range of 0.07 to 0.15, preferably 0.12 to 0.145.

Additionally, also the crest areas 24, 25 of the teeth 28, 29 are combined to a double punching track so that two punching rows are connected to each other. This means that the crest areas 24, 25 need not be re-cut together with the inner and outer flanks 22, 23. To this end, a concave junction region 26 with radius $R_S$ is punched between the adjacent crest areas 24, 25, primarily in order to reduce the notch effect.

With a pitch of T 6.3 mm the radius $R_S$ is, for instance, 0.5 mm. The ratio between radius $R_S$ and the pitch T is, accordingly, 0.079 and is in the range of 0.07 to 0.09, preferably 0.07 to 0.081.

In the eventual waste-free process of separating the link plate blanks straight separation surfaces 27 between the crest areas 24 and 25 are produced by means of a waste-free separating cut. The separation surface 27 runs straight and parallel to the longitudinal axis L of the link plate (preferably in an angle range of ±30° to a vertical relative to the longitudinal axis L of the link plate). The waste-free separating cut between the crest areas 25, 26 is realized with a straight cut portion of 20% to 30% and a surface roughness of RZ 63 to 100 and, therefore, need not have the quality of the re-cut outer and inner flanks 22, 23 (preferably a straight cut portion of about 70% to 80% and a surface roughness of not worse than $R_z$ 9).

In the present embodiment the straight end face 21 may have a length $L_S$ of 1.94 mm with a pitch of 6.35. This corresponds to a ratio of length $L_S$ to pitch T of 0.306 and is thus in the range of 0.2 to 0.4, preferably 0.28 to 0.32.

The length $L_Z$ of the separation surface 27 with a pitch T of 6.35 mm is, in the present embodiment, 1.1 mm This corresponds to a ratio of length $L_Z$ to pitch T of 0.173 and is thus in a range of 0.14 to 0.24, preferably 0.15 to 0.19. In the present embodiment the length $L_Z$ is 1.1 mm for a pitch T of 6.5 mm, preferably in a range of 0.9 to 1.5 mm.

Figure 16:
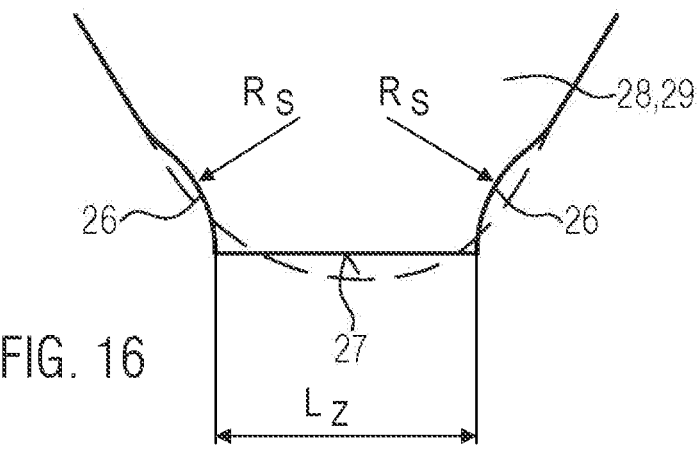
FIG. 16 shows an enlarged illustration of a crest area of a tooth link plate blank of FIG. 14.

In FIG. 16 the dashed line shows the otherwise common run of a crest area of a tooth link plate, which is normally re-cut as well during the re-cutting process. Due to the novel arrangement and mode of operation a link plate type shape of the crest areas 24, 25 is created which is offset relative to the outer and inner flanks 22, 23. As they are not getting active in the later engagement into a chain wheel it is possible to except them from the re-cutting process.

Based on this approach no punch has to be provided for the pre-punching and re-cutting which has to move in between the crest areas 24, 25 of adjacent link plate blanks pointing to one another with the teeth 28, 29. This permits the longitudinal axes L of the link plates to come closer together within a double punching row. FIG. 17 shows six punching rows which are combined to three double punching rows and are arranged on one common sheet metal strip S.

Similar to the straight link plates of the preceding embodiments the punching of the toothed link plates, too, can be performed with a reduced feed length V. In the present case a high-performance tooth chain with a pitch T of 6.35 mm is to be produced. The feed length V=12.4 mm, which corresponds to 1.953×T. It can be learned from the dashed lines in FIG. 15, however, that the tooth link plates in the prior art were somewhat shorter (0.4 mm) because the head area 10 had already been optimized to a great extent. However, due to the low-waste separating cut the feed length V can be reduced as a whole.

Additionally, also the claimed width can be reduced. The link plate height H is 7.13 mm, which corresponds to a double punching row width D of 14.26 mm.

As can be seen in FIG. 16 the height of previously produced tooth link plates had been slightly larger, by about 0.1 mm. In addition, a space between the crest areas had to be provided allowing a punch of sufficient thickness to punch through completely. This resulted in a double punching row width D of 16.9 mm with comparable high-performance tooth link plates which were, moreover, punched with a feed length V=15.7 mm. According to FIG. 17 the sheet metal band S has a total width B of 57.6 mm. With the same necessary minimum edge distance to the external link plate backs 15 a sheet metal band width B of 65 mm was previously required in the prior art for comparable tooth link plates with six punching rows. The new punching method and the newly chosen high-performance tooth link plate shape accordingly result in a saving of material of about 30% in the production of an identical number of tooth link plates. This is an enormous dimension given the number of units usually required in the automotive sector.

In the preceding embodiments a sheet metal band of steel having a thickness of the link plate to be produced is fed in the form of strip stock to a punch press and moved further cycle by cycle with the feed length V. In each cycle a special punching step is performed. Depending on the choice of the individual punching steps, for instance, 12 or more cycles may be necessary to produce a link plate, i.e. until the link plate is separated from the succeeding link plate blank. Accordingly, it is also possible to pre-punch and re-cut and separate the individual areas separately from each other. The invention allows using the areas of a link plate, especially the head areas which are produced with a less exact surface quality, in order to perform a lower-waste method. As a consequence, the shape and configuration of the corresponding link plates are slightly different. Additionally, the crest areas of toothed link plates are used as well, which need not necessarily have a re-cut surface quality either. All in all, the present mass production of high-performance link plates and associated high-performance chains entails a considerable cost reduction on account of considerable savings of material.

Figure 18:
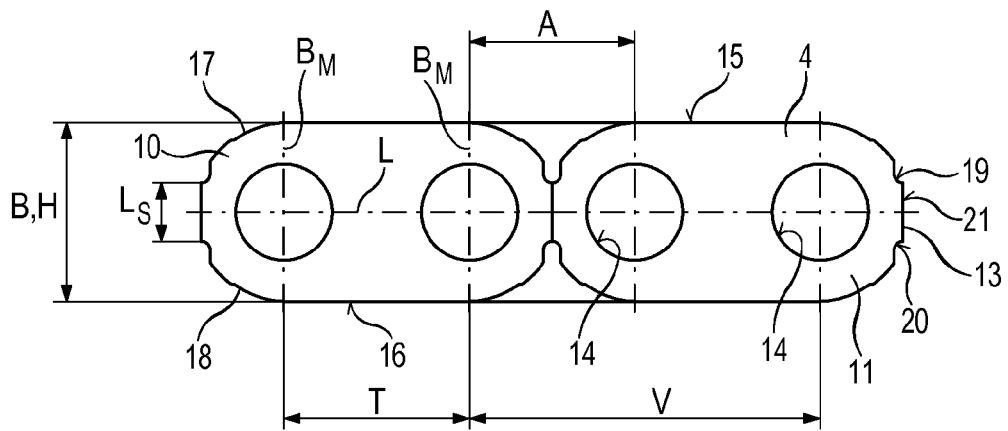
FIG. 18 shows a reduced illustration of a sheet metal band with one single punching row for the production of untoothed chain link plates.

An alternative production form for an inner link plate 4 will now be explained in more detail by means of FIG. 18. The sheet metal band S having the thickness of the link plates has a width B that corresponds to the height of the link plates. As a pre-punching and re-cutting of the link plate backs is waived and a re-cutting is carried out only in the region of the openings, the link plate backs are shaped by the side edge faces of the sheet metal band S. This saves not only material, but also working steps.

Depending on the configuration of the starting steel band the finished link plates may then have the cross-sectional shapes illustrated in FIGS. 20 and 21. It can be seen in FIG. 20 that both the link plate back 15 and the link plate belly 16 have a convexly curved shape. The cut is made exactly along the bore center line $B_M$ which runs perpendicular to the longitudinal center line L. This convex shape extends across the entire length of the link plate back 15 and the link plate belly 16 in the region between the two bore center lines $B_M$. Subsequently, this convex curvature changes and becomes increasingly flatter along the head areas 10, 11 until the curvature has totally disappeared and the rest of the head area 10, 11 runs in a straight line in the transverse direction. The radius R of the curvature of the link plate back 15 and the link plate belly 16 corresponds to half the thickness d of the inner link plate 4.

The same technique may be employed for the outer link plates.

Given such a symmetrical structure of the inner link plate 4 it is also possible to install the link plate turned around the longitudinal center line L. However, a link plate 4 of this type also allows the production of chains and chain drives that include both external and internal guide rails and tensioner blades, respectively.

The link plate backs 15 of the inner link plate 4 is in line contact in the region of the highest part of the curvature whilst sliding along the sliding surface of a guide rail or tensioner blade. Due to the rounded shape the link plate back 15 does not significantly cut into the sliding surface of a guide rail or tensioner blade, respectively. Also, the shape supports the adjustment of a hydrodynamic lubricating film as the link plate back 15 moves along the rails.

The essential difference of the cross-sectional shape in FIG. 21 is that the link plate belly 16 has no curvature, but has a straight cross section. The link plate back 15, again, is provided with a curvature having a radius R that corresponds to half the link plate thickness d. In the embodiments of FIGS. 20 and 21 merely the openings are re-cut so as to obtain a better surface quality.

Figure 19:
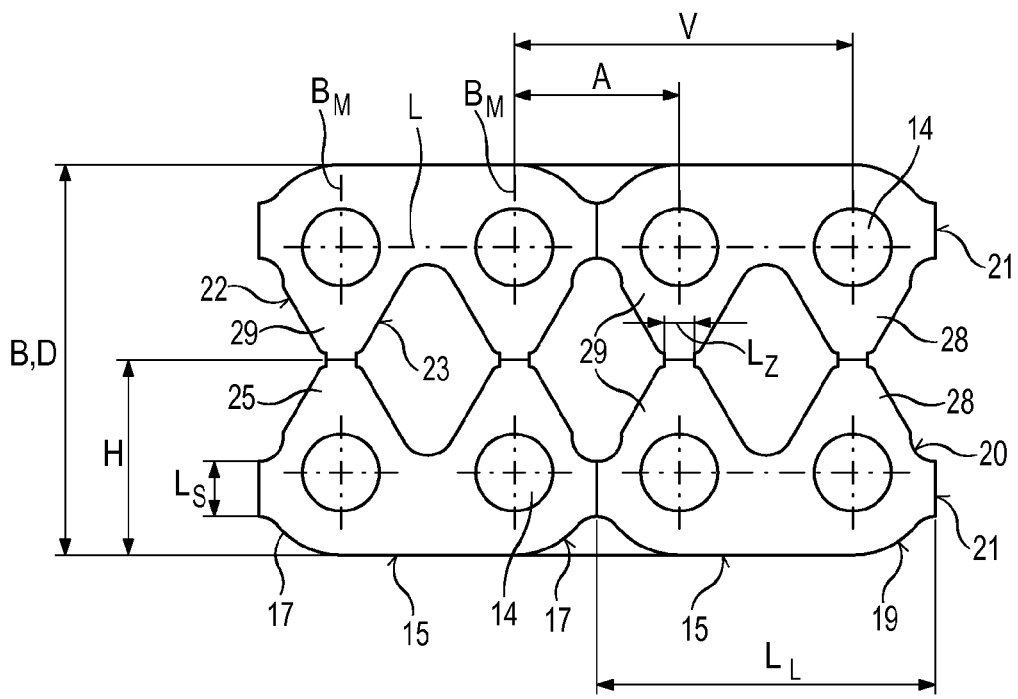
FIG. 19 shows a reduced illustration of a sheet metal band with two punching rows for the production of toothed chain link plates, FIG. 20 an enlarged illustration of an alternative cross-sectional shape of a chain link plate of FIG. 3, FIG. 21 an enlarged illustration of another alternative cross-sectional shape of a chain link plate of FIG. 3, FIG. 22 an enlarged illustration of an alternative cross-sectional shape of a toothed chain link plate for a toothed chain of FIG. 13.

The modified production illustrated in FIG. 19 for the production of a tooth link plate makes use of a steel band S having a width B which corresponds to double the height H of the individual tooth link plates. In this case, again, the link plate backs 15 are defined by the side edge surfaces of the sheet metal band S so that a pre-punching and re-cutting of the link plate back 15 may be omitted. The shape of the link plate back 15 is rather predefined by the side edge surface of the sheet metal band S.

Depending on the configuration of the steel band S the finished tooth link plates may then have the cross-sectional shape shown in FIG. 22. According to the embodiment of FIG. 22 the link plate back 15 has a curved convex shape with a radius R which corresponds to half the link plate thickness d. Between the center line $B_M$ of the two sleeve openings 14 the link plate back 15 runs parallel to the longitudinal center line L, joined by a junction region toward the head areas 10, 11. In this junction region the curvature quickly disappears until it is straight. The end faces 21 are plane and not curved. The link plate belly has two downwardly projecting teeth 28, 29 which have a rounded junction in the middle. The tooth flanks and the rounded junction are re-cut so as to obtain a better surface quality. So are the openings 14.

The above-described chains are used for a chain drive 30 an example of which is illustrated in FIG. 23. The drive is a timing chain drive of an internal combustion engine which connects the crankshaft sprocket 31 to the two camshaft sprockets 32.1, 32.2. To this end, the plate link chain 1 is passed around the chain wheels 31, 32.1, 32.2, with the section between crankshaft sprocket 31 and the camshaft sprocket 32.2 shown on the right of the drawing being guided by a guide rail 33. The section between the crankshaft sprocket 31 and the camshaft sprocket 32.1 shown on the left of the drawing is guided by means of a tensioner blade 35 which is pivotably mounted on the engine block 34 and pressed against the plate link chain 1 by means of a chain tensioner 36. This is accomplished by means of the clamping piston 37 of the chain tensioner 36 which exerts pressure on the back area of the tensioner blade 35. In the present case a screw-in chain tensioner is used which is screwed into a section of the engine block 34. The type of chain tensioner is of no significance for the invention, however.

Hence, the plate link chain 1 has to be adapted to be capable of sliding along the sliding surfaces of the guide rail 33 and the tensioner blade 35. Depending on the structure of the plate link chain 1 only some of the link plates 4, 7, 7.1 are in contact with the respective rail or blade 33, 35. In many cases all link plates are adapted to have the same height and are arranged such that all link plate backs 15 have contact. There are embodiments, however, in which exclusively the link plate backs of the inner link plates or outer link plates are in contact with the respective rails or blades 33, 35. To this end, the link plate backs of the corresponding link plates project slightly more forward. A combination is conceivable, however. In the above description the configuration of the outer and inner link plates was partially being referred to by way of examples only. The configuration of the respectively associated outer and inner link plates in the same or similar manner is possible. Also, the outer link plates and the inner link plates may exclusively have this design.

The invention claimed is:

1. A method for producing high-performance chain link plates with a pitch T, the method comprising the following steps of:
   clocked feeding of a sheet metal band with a feed length per a cycle,
   pre-punching at least two chain link plate blanks arranged in succession, cutting at least one functional area of at least one chain link plate blank, wherein head areas of chain link plate blanks arranged in succession are still connected to each other, and
   separating the connected head areas of chain link plate blanks arranged in succession,
   wherein the feed length is smaller than 2.1 ×T, and an upper or lower side of the head areas connected to each other is provided with an at least partially concave contour by means of a punching process substantially adjacent to the end face produced in a subsequent step.

2. The method according to claim 1, wherein the feed length is in a range of 1.8 to 2.1 ×T.

3. The method according to claim 1, wherein the feed length corresponds to a length $L_L$ of a finished high-performance chain link plate, including a tolerance of ±0.2 mm.

4. The method according to claim 1, wherein the connected head areas are separated by a separating cut.

5. The method according to claim 4, wherein by means of the separating cut, the head area is provided with an end face that runs in an angle range of ±30° relative to a vertical axis.

6. The method according to claim 4, wherein by means of the separating cut, the head area is provided with an end face that is perpendicular relative to a longitudinal axis of the link plate.

7. The method according to claim 1, wherein a ratio of the radius of the concave contour at the head areas to the pitch T is 0.04 to 0.07.

8. The method according to claim 1, wherein a ratio of the length of the end face to the pitch T is in a range of 0.2 to 0.4.

9. The method according to claim 1, using at least two punching rows for production of toothed high-performance chain link plates, the method comprising the following additional steps of:
   cutting at least tooth flanks of a toothed chain link plate blank, wherein crest areas of teeth pointing to each other of two punching rows placed side by side remain coupled.

10. The method according to claim 9, wherein the crest areas connected to each other are separated from each other after the cutting of the tooth flanks.

11. The method according to claim 10, wherein connected crest areas are separated by means of a separating cut.

12. The method according to claim 11, wherein the separating cut for separating the connected crest areas is accomplished substantially in or parallel to the longitudinal axis of the link plate to produce crest areas each with a straight separation surface.

13. The method according to claim 9, wherein a punching row width of the chain link plate blanks connected to each other in the crest areas substantially corresponds to double a link plate height of a finished high-performance chain link plate.

14. The method according to claim 9, wherein junction regions between outer and inner flanks and the connected crest areas are provided with an at least partially concave contour by means of a punching process substantially adjacent to a separation surface produced in a subsequent step.

15. The method according to claim 9, wherein a ratio of length of the separation surface to the pitch T is in a range of 0.14 to 0.24.

16. The method according to claim 9, wherein a ratio of the radius $R_{K1}$ and $R_{K2}$ of the concave contour at the head area to the pitch T is 0.07 to 0.15.

17. The method according to claim 9, wherein a ratio of the radius $R_S$ of the concave contour at the crest areas to the pitch T is 0.07 to 0.09.

18. The method according to claim 9, wherein a ratio of length of the separation surface to the pitch T is in a range of 0.15 to 0.19.

19. The method according to claim 9, wherein a ratio of the radius $R_{K1}$ and $R_{K2}$ of the concave contour at the head area to the pitch T is 0.12 to 0.145.

20. The method according to claim 9, wherein a ratio of the radius $R_S$ of the concave contour at the crest areas to the pitch T is 0.077 to 0.081.

21. The method according to claim 1, wherein the sheet metal band has at least one side edge face with a convex curvature that runs transversely to a longitudinal axis of the sheet metal band, and
   wherein after the pre-punching and separating, a link plate back is shaped by a section of a convex side edge face of the sheet metal band, at least in a region of a supporting section for sliding contact with a tensioner blade or a guide rail.

22. The method according to claim 1, wherein a feed length is in the range of 1.9 to 2.0 ×T.

23. The method according to claim 1, wherein a ratio of the radius of the concave contour at the head areas to the pitch T is 0.048 to 0.055.

24. The method according to claim 1, wherein a ratio of the length of the end face to the pitch T is in a range of 0.28 to 0.32.

25. The method for producing a high-performance chain using high-performance chain link plates which have been produced by means of a method comprising the following steps of:
   clocked feeding of a sheet metal band with a feed length per a cycle,
   pre-punching at least two chain link plate blanks arranged in succession,
   cutting at least one functional area of at least one chain link plate blank, wherein head areas of chain link plate blanks arranged in succession are still connected to each other, and
   separating the connected head areas of chain link plate blanks arranged in succession,
   wherein the feed length is smaller than 2.1 ×T, and an upper or lower side of the head areas connected to each other is provided with an at least partially concave contour by means of a punching process substantially adjacent to the end face produced in a subsequent step.

26. A high-performance chain link plate comprising head areas and at least one cut functional area, wherein the head areas each have an end face that runs in an angle range of ±30° relative to a vertical and is produced by means of a separating cut, and an upper or lower side of the head areas have an at least partially concave contour substantially adjacent to the end face.

27. The high-performance chain link plate according to claim 26, wherein the head areas have a flap type projection relative to an adjacent link plate contour.

28. The high-performance chain link plate comprising two teeth according to claim 26, wherein crest areas of the teeth have a separation surface or end face, respectively, that runs in an angle range of ±30° and is produced by means of a separating cut.

29. The high-performance chain link plate according to claim 28, wherein the crest areas have a flap type projection which is offset relative to an adjacent link plate contour.

30. The high-performance chain link plate according to claim 26, wherein a link plate back has a convex curvature that runs transversely to a longitudinal center line of the high-performance chain link plate in an area of a supporting section for sliding contact with a tensioner blade or a guide rail.

31. The high-performance chain link plate comprising two teeth according to claim 26, wherein crest areas of the teeth have a separation surface or end face, respectively, that runs substantially in parallel, relative to the longitudinal axis of the link plate and is produced by means of a separating cut.

32. A high-performance chain comprising high-performance chain link plates having head areas and at least one cut function area, wherein the head areas have an end face that runs in an angle range of ±30° relative to a vertical and is produced by means of a separating cut, and an upper or a lower side of the head areas have an at least partially concave contour substantially adjacent to the end face.

33. A high-performance chain link plate comprising head areas and at least one cut functional area, wherein the head areas each have an end face that is substantially perpendicular relative to the longitudinal axis of the link plate and is produced by means of a separating cut, and an upper or lower side of the end areas have an at least partially concave contour substantially adjacent to the end face.

* * * * *